US008200591B2

(12) United States Patent
Govindaraj et al.

(10) Patent No.: US 8,200,591 B2
(45) Date of Patent: Jun. 12, 2012

(54) SELF-ORGANIZED DISTRIBUTED DIRECTORY

(75) Inventors: Subbian Govindaraj, Solon, OH (US); Raymond J. Staron, Chagrin Falls, OH (US); Charles Martin Rischar, Chardon, OH (US); Kenwood H. Hall, Hudon, OH (US); David A. Vasko, Merton, WI (US); Robert J. Kretschmann, Bay Village, OH (US); Michael D. Kalan, Highland Heights, OH (US); Paul R. D'Mura, Glendale, AZ (US); Taryl J. Jasper, South Euclid, OH (US); Eugene Liberman, Rocky River, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1154 days.

(21) Appl. No.: 12/019,467

(22) Filed: Jan. 24, 2008

(65) Prior Publication Data
US 2009/0193029 A1 Jul. 30, 2009

(51) Int. Cl.
*G06F 15/18* (2006.01)
*G05B 11/00* (2006.01)
*G05B 23/00* (2006.01)
*G05B 13/02* (2006.01)

(52) U.S. Cl. ........... 706/16; 706/22; 706/23; 706/46; 706/903; 706/906; 700/28

(58) Field of Classification Search ............ 706/16
See application file for complete search history.

(56) References Cited

U.S. PATENT DOCUMENTS

| 4,389,706 A | 6/1983 | Gomola et al. |
| 4,517,637 A | 5/1985 | Cassell |
| 5,142,623 A * | 8/1992 | Staab et al. ............... 709/236 |
| 5,345,586 A | 9/1994 | Hamala et al. |
| 5,975,737 A | 11/1999 | Crater et al. |
| 6,064,814 A | 5/2000 | Capriles et al. |
| 6,098,108 A | 8/2000 | Sridhar et al. |
| 6,393,459 B1 | 5/2002 | Lurndal |
| 6,529,780 B1 | 3/2003 | Soergel et al. |
| 7,082,348 B1 | 7/2006 | Dahlquist et al. |
| 7,120,690 B1 | 10/2006 | Krishnan et al. |
| 7,123,974 B1 | 10/2006 | Hamilton |
| 7,136,911 B1 | 11/2006 | Nakazawa |
| 7,151,966 B1 | 12/2006 | Baier et al. |
| 7,191,436 B1 | 3/2007 | Durr et al. |
| 7,228,185 B2 | 6/2007 | Patz et al. |
| 7,308,473 B1 | 12/2007 | Thomas et al. |
| 7,315,854 B2 | 1/2008 | Kumar |

OTHER PUBLICATIONS

Fornaciari et al., A Agent-based Approach to Full Interoperability and Allocation Transparency in Distributed File Systems [online], 2001 [retrieved on Jul. 8, 2011]. Retrieved from the Internet<URL:http://home.dei.polimi.it/zaccaria/2.0/pdf/C7.pdf>.*

* cited by examiner

*Primary Examiner* — Jeffrey A Gaffin
*Assistant Examiner* — Nathan H Brown, Jr.
(74) *Attorney, Agent, or Firm* — Turocy & Watson, LLP; Scott Speroff; John M. Miller

(57) ABSTRACT

Various amounts of information can be beneficial to different controllers configured upon an industrial control system. Information can be retained in a distributed directory such that controllers quickly learn information concerning other controllers. The distributed directory can be automatically constructed and populated with information from different controllers. When a module enters an industrial control system, information can automatically advertise to other units through use of the distributed directory.

19 Claims, 10 Drawing Sheets

SELF-ORGANIZED DISTRIBUTED DIRECTORY

TECHNICAL FIELD

The subject specification relates generally to a distributed directory and in particular to automatically arranging information upon the distributed directory.

BACKGROUND

Industrial control environments can typically involve complex mechanical, electronic, electromechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation, (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

Different controls can be used to provide protective features in an industrial environment. If a user attempts to make a change upon the industrial environment, then various checks can take place to discover if a user is authorized to make the change, such as requesting the user to enter a username and password. In addition, the user can be provided various tools that can assist in making changes to the industrial environment, including providing a template to be used to make different modifications.

SUMMARY

The following discloses a simplified summary of the specification to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Conventionally, a general directory holds information concerning an industrial control system. Various details about units integrated into the system as well as data about operation of the control system as a whole are published in the directory and can be accessed by various units. Specific examples of data commonly in a directory are locations of controllers and capabilities. However, numerous difficulties can occur in conventional directory implementation. In an illustrative example, directories commonly have a single point of failure and if a malfunction takes place upon the directory, then the control system can experience costly errors.

The disclosed innovation allows a distributed directory to be utilized in retention of control system information and making the information available. A gather component collects information from a controller and a placement component populates the collected information into a directory. Various features can be practiced in relation to placement of information upon the distributed directory. A newly added module can automatically publish information to the distributed directory and populated information can have limited access rights. In addition, practice of aspects of the disclosed innovation can facilitate creation of a new directory automatically.

The disclosed innovation teaches against conventional industry practice; conventional practice focuses on utilization of a centralized directory. In addition, since directory parameters can be complex and highly important, directories are commonly generated manually. The disclosed innovation focuses directory building, specifically distributed directory building, in a new direction—the direction of automatic creation.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
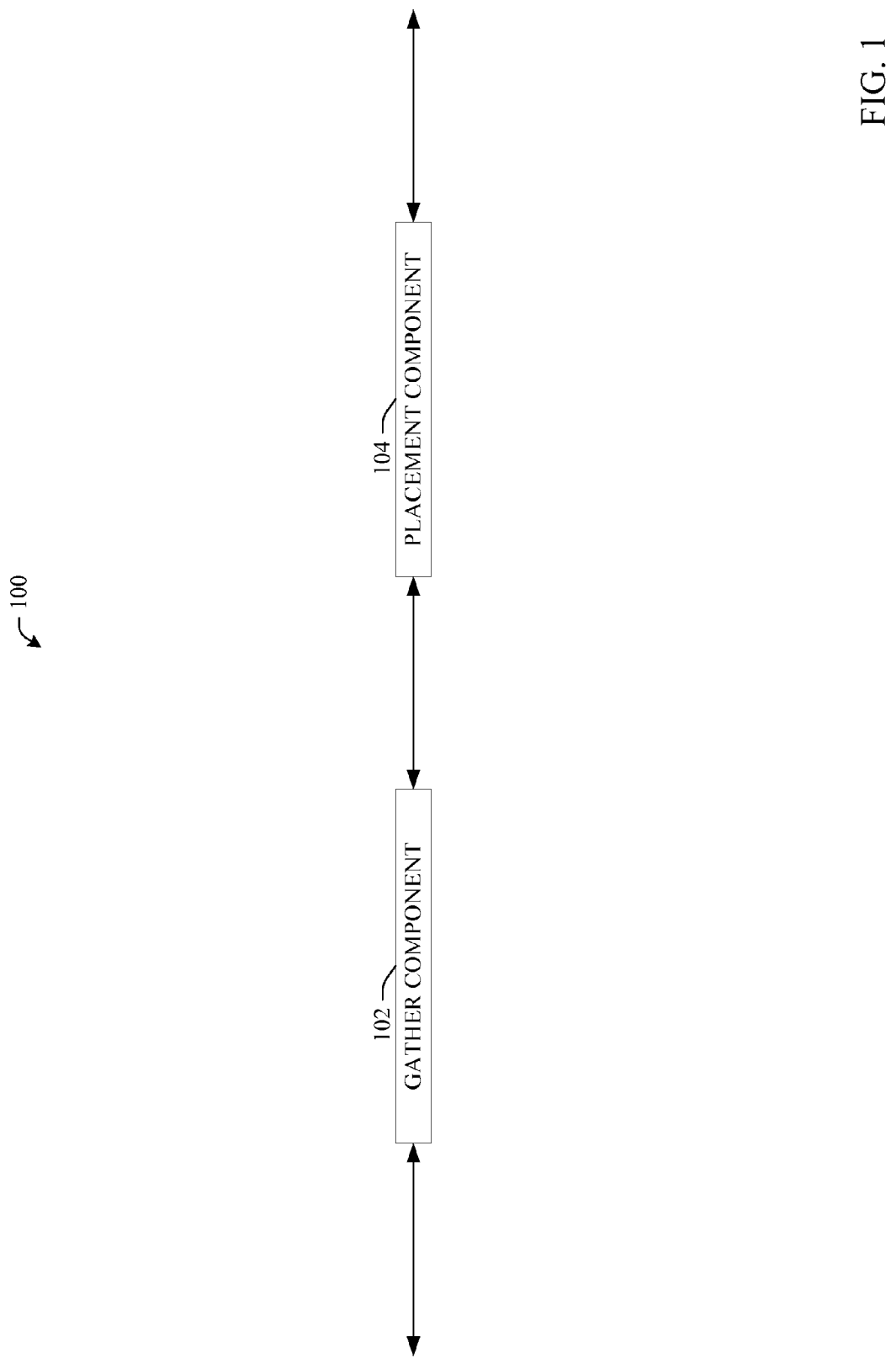
FIG. 1 illustrates a representative distributed directory population system in accordance with an aspect of the subject specification.

The claimed subject matter is now described with reference to the drawings, wherein like reference numerals are used to refer to like elements throughout. In the following description, for purposes of explanation, numerous specific details are set forth to provide a thorough understanding of the claimed subject matter. It can be evident, however, that the claimed subject matter can be practiced without these specific details. In other instances, well-known structures and devices are shown in block diagram form to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Moreover, it is to be appreciated that determinations or inferences made throughout the subject specification can be practiced through implementation of artificial intelligence techniques.

Now referring to FIG. 1, an example system 100 is disclosed for populating information upon a distributed directory. A common industrial control system can include a number of controllers and associated devices integrated together capable of performing different tasks. To share information with relative ease and security in a reliable manner, a distributed directory can be implemented.

A distributed directory is oftentimes a set of services similar to a telephone book that allows for management of an industrial control system. Information located in the distributed directory can be stored in another location, such as local storage of a controller. The distributed directory can configure as an ordered collection of searchable keys (e.g., names and addresses) used to locate information and services.

A distributed directory can allow controllers to advertise different services to other controllers. For instance, if a mixer is not being used, then the mixer can advertise availability though the distributed directory as well as semi-static data, such as an address of the mixer. In addition, metadata related to different devices can be shared through the distributed directory; a mixer can disclose properties that can be beneficial to other modules, such as that a mixer is glass lined. The distributed directory is distributed across several nodes, thus the distributed directory is more failure tolerant. Commonly, there is not a single point of failure such that an industrial control system can operate with a node failure. Moreover, the distributed directory can grow and change based upon different relationships and controllers available.

The system 100 allows information to be placed upon a distributed directory of an industrial control system. A gather component 102 can collect information from a component (e.g., devices, software modules, enterprise systems, and the like) and perform processing upon the gathered information. A controller can be any suitable industrial control, such as a programmable logic controller (PLC), an industrial control emulation device, or like device. According to one embodiment, a controller can test a mixer to determine a cleanliness level. The gather component 102 can extract the cleanliness level from the controller as well as relevant metadata, such as an address of the mixer and a time when the level was taken.

A placement component 104 can populate at least a portion of collected information upon a distributed directory. Population can include placing new information in the directory as well as deleting old entries and replacing deleted details with collected information. Determinations can be made on what information qualifies for placement upon the directory as well as information to be locally stored (e.g., for possible later placement) or deleted (e.g., from storage of a component of the system 100). Additionally, the placement component 104 can determine how information is to be populated in the distributed directory and implement population accordingly. The placement component 104 can populate open areas of a distributed directory with information (e.g., free space) as well as populate information through selective management (e.g., placing data in a directory where data already exists and can include deletion, compression, prioritization, and so forth). While portions of the subject specification discuss the disclosed innovation in relation to controllers, it is to be appreciated that aspects can be practiced with various components, including devices, software modules, enterprise systems, and so on.

Figure 2:
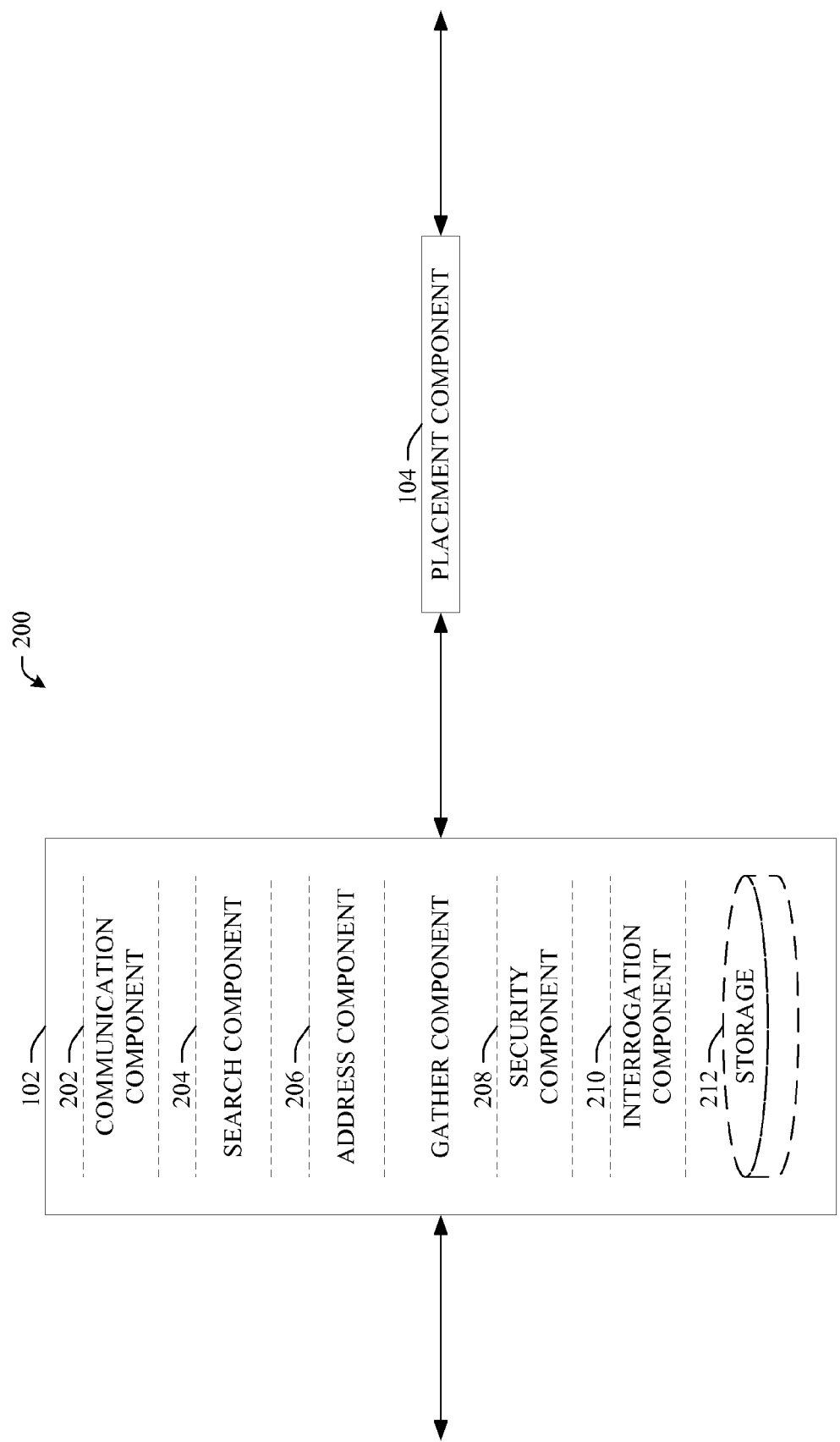
FIG. 2 illustrates a representative distributed directory population system with a detailed gather component in accordance with an aspect of the subject specification.

Now referring to FIG. 2, an example system 200 is disclosed for populating information upon a distributed directory with a representative expanded gather component 102. A communication component 202 can engage with other components (e.g., controllers) to transfer information, such as to send a request for information, receiving information, etc. Operation can take place wirelessly, in a hard-wired manner, employment of security technology (e.g., encryption), etc. Moreover, the communication component 202 can utilize various protective features, such as performing a virus scan on collected data and blocking information that is positive for a virus.

A search component 204 can learn of a device such as a controller (e.g., become aware the controller is electronically coupled to an industrial control configuration) or learns of at least one change in a configuration of the device, where in one embodiment, collection of information from the controller does not take place until the search component learns of the controller or learns of at least one change in the configuration of the device. A search component 204 can locate different sources, such as controllers, storage and the like from which information can be obtained. Some industrial control systems can be continually changing, with various modules being added and removed. For instance, a configuration of a module in an industrial control system can change and the change reflects into the directory (e.g., a new program added to a controller is placed in the directory). The search component 204 can perform continuous checks to determine locations of different sources as well as relationships between the sources. Moreover, a local network map can be retained of known sources as well as source relationships; a check can be periodically made to update the map. It is possible that controllers entering an industrial control configuration advertise relevant metadata automatically, thus information can be collected by the gather component 102 before the search component 204 learns of the controller or automatically advertised information is how the search component 204 learns of the controller.

An address component 206 can determine location information or a path to a device, location information or the path can be placed upon the distributed directory. The address can be an absolute address (e.g., a location name), a relative address (e.g., a location in relation to other units), and the like. Analysis of the industrial control configuration can take place to determine address details concerning the controller.

A security component 208 can regulate distributed directory information that can be ascertained by the device or selectively mask distributed directory information with regard to at least one module (e.g., commonly not a device providing the information). Oftentimes, information is intended to have limited access. For instance, if a newly added component is made and expected to be serviced by a third party, then trade secret information will commonly not want to be made available to the controller. Therefore, the security component 208 can regulate information (e.g., distributed directory entries) that can be accessed by a controller. Conversely, a controller can have information that is not to be available to modules linked with the distributed directory, such as authentication codes. The security component 208 can limit accessibility of the information to certain controllers while still having the information placed upon the distributed directory.

An interrogation component 210 can resolve information of the device for collection, the gather component 102 can collect at least a portion of resolved information. It can be common for a controller to have a relatively vast amount of different details and not all details are often relevant for publication upon a distributed directory. The interrogation component 210 can determine information that has a relatively high likelihood of being selected for population and the determined information can be collected.

Different details, such as collected information, component operating instructions (e.g., of the search component 204), source location and path, a configuration map, etc. can be held on storage 212. Storage 212 can arrange in a number of different configurations, including as random access memory, battery-backed memory, hard disk, magnetic tape, etc. Various features can be implemented upon storage 212, such as compression and automatic back up (e.g., use of a Redundant Array of Independent Drives configuration). A placement component 104 can populate the distributed directory with collected information.

Figure 3:
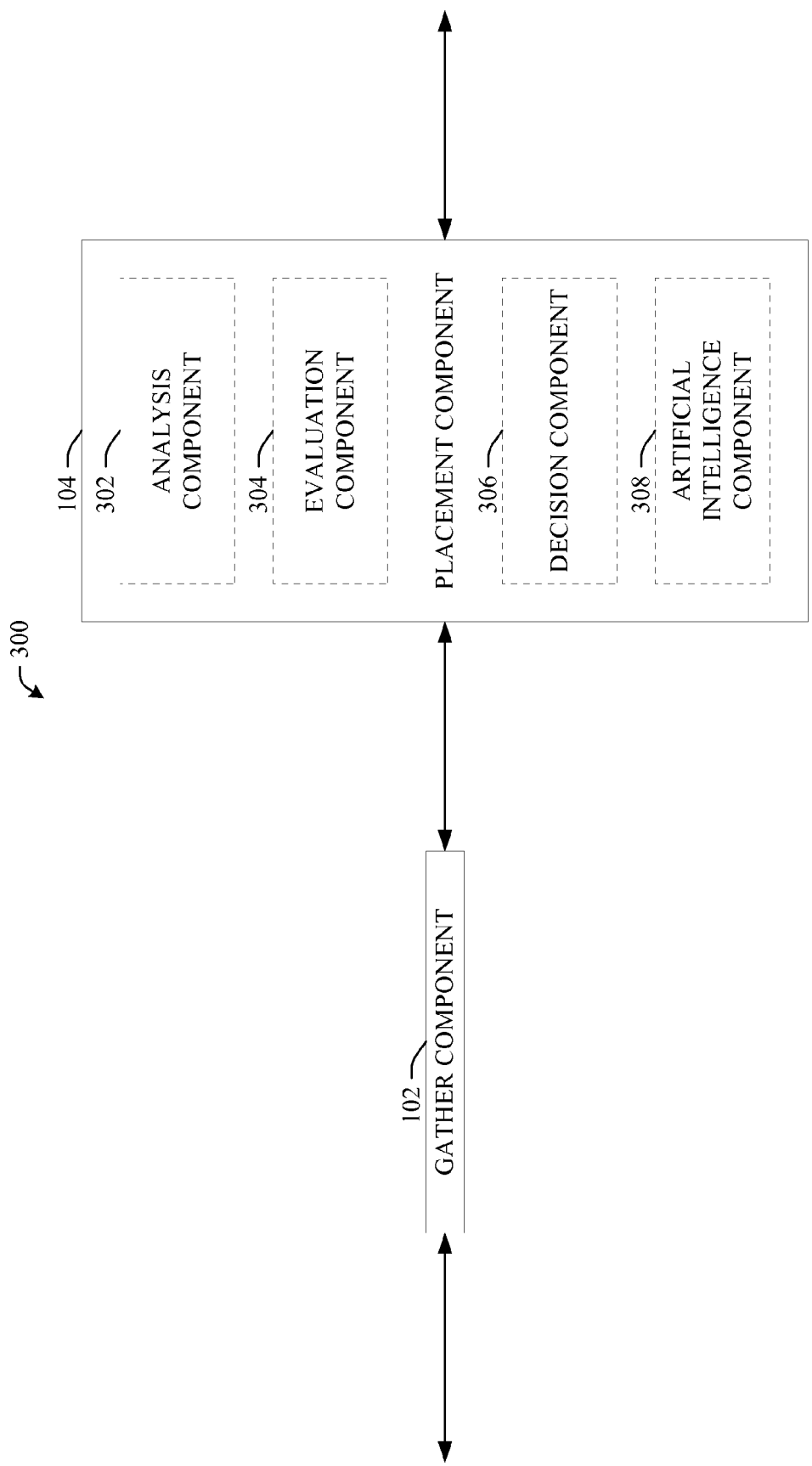
FIG. 3 illustrates a representative distributed directory population system with a detailed placement component in accordance with an aspect of the subject specification.

Now referring to FIG. 3, an example system 300 is disclosed for populating information upon a distributed directory with a representative expanded placement component 104. A gather component 102 can collect information from a device located upon an industrial control configuration implementing the system 300. The controller can be a newly added module as well as an existing module with changed information. The placement component 104 can determine collected information that is to be published upon a distributed directory.

Metadata related to the distributed directory as well as collection information can be used to assist in information population. An analysis component 302 can assess collected information to determine information that should be populated upon the distributed directory. Common analysis includes identifying different pieces of information and categorizing identified information (e.g., there is a bowl lining property of a mixer and the property can be classified as a physical attribute).

An evaluation component 304 can appraise the distributed directory to determine relevant parameters. For instance, the distributed directory can hold a large number of a certain information type (e.g., device properties) which can be an indicator of information controllers expect to find in the distributed directory. The evaluation component 304 can also determine attributes of the distributed directory, such as available storage space.

A decision component 306 can select information for population into the distributed directory, the placement component 104 can populate the distributed directory with selected information. A result of the assessment of the analysis component can be used in selection of information for population into the distributed directory. Moreover, an outcome of the appraisal can be used in selection of information for population into the distributed directory.

An artificial intelligence component 308 can make at least one inference or at least one determination in regard to the information collection or the distributed directory population. For example, a determination can be made when a controller is coupled to an industrial control system and when data can be extracted from the controller. In one illustrative instance, an inference can be made that a user change in controller operation (e.g., alteration of controller computer code) will result in information changing and thus some distributed directory information is deleted and/or replaced with other information.

The artificial intelligence component 308 can employ one of numerous methodologies for learning from data and then drawing inferences and/or making determinations related to applying a service (e.g., Hidden Markov Models (HMMs)

and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

Figure 4:
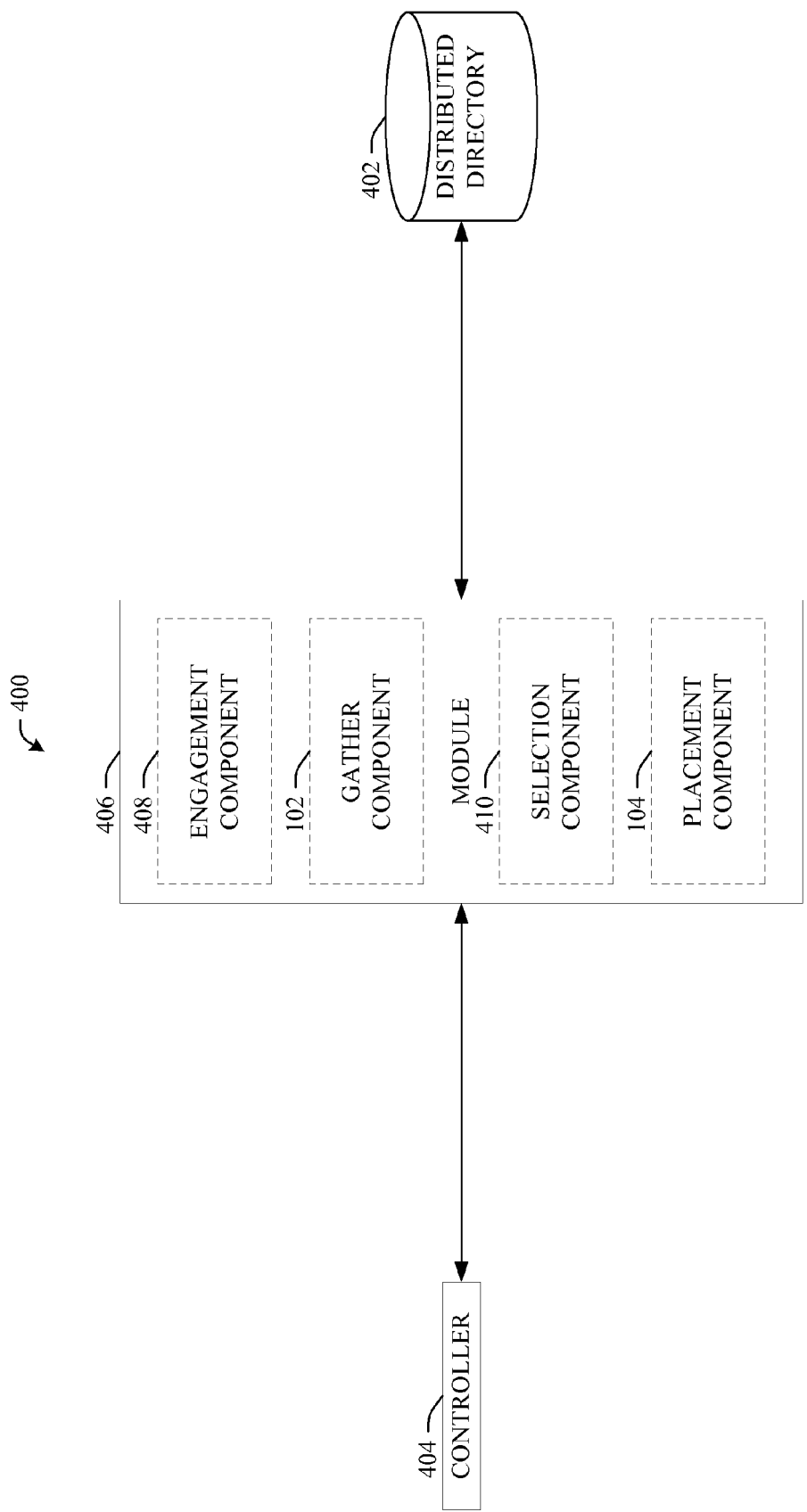
FIG. 4 illustrates a representative system for adding information to a distributed directory concerning a newly added controller in accordance with an aspect of the subject specification.

Now referring to FIG. 4, an example system 400 is disclosed for populating a distributed directory 402 with information from a controller 404 newly added or modified to an industrial control configuration. A module 406 can include various components disclosed in the subject specification. Moreover, the module 406 can couple to the controller 404 or the distributed directory 402 as well as other units.

An engagement component 408 can facilitate connection of a controller such that the controller becomes 'newly coupled'. A newly coupled controller can include a controller that has never before coupled with the control configuration, has previously coupled to the control configuration, but was severed (e.g., virtually instantaneous severing and re-coupling), has previously coupled at through a different entry point than currently used, and the like. The engagement component 408 can operate as a means for engaging a module newly coupled to an industrial control configuration.

A gather component 102 can collect information from the engaged controller 404. A selection component 410 can determine characteristics of the engaged controller. Since the controller is newly coupled, it can be difficult to appreciate initially how the controller interacts with other units and thus information that is likely to be beneficial. The selection component 410 evaluates the controller 404 and predicts information that is to be placed in the distributed directory.

A placement component 104 can populate information into the distributed directory (e.g., information about the controller 404, information about an industrial system, and the like). The placement component 104 can function as a means for augmenting a distributed directory with metadata that concerns the engaged module. In a situation where the newly coupled module has not previously been coupled to the industrial control configuration, augmentation can include adding data to the distributed directory. However, if the newly coupled module has previously been coupled to the industrial control configuration, augmentation can include updating entries in the distributed directory added during a previous coupling of the module.

According to one embodiment, the means for augmenting a distributed directory with metadata that concerns the engaged component operates automatically. In this case, the placement component 104 can include a means for manually overriding the means for augmenting the distributed directory. However, the means for augmenting a distributed directory with metadata that concerns the engaged component can operate manually (e.g., through commands collected from a terminal upon which a user can enter data for augmentation).

The placement component 104 can continuously update information upon the distributed directory 402. For instance, as characteristics of the controller 404 change, the placement component 104 can modify entries accordingly. In addition, if some information placed in the distributed directory was inappropriately placed (e.g., from incorrect choice of the selection component 410), then the placement component 104 can change an entry to convey more appropriate information.

Figure 5:
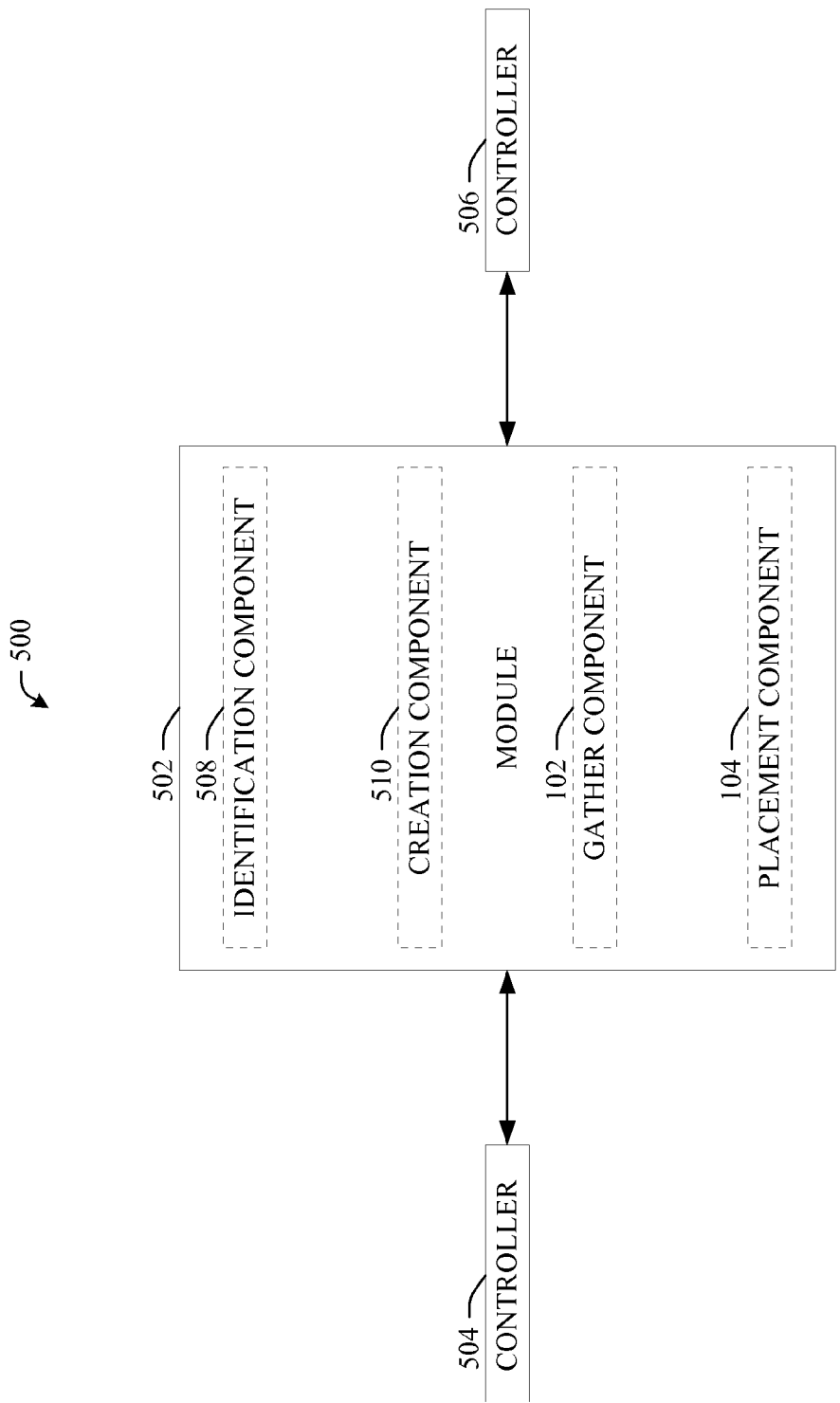
FIG. 5 illustrates a representative distributed directory construction system in accordance with an aspect of the subject specification.

Now referring to FIG. 5, an example system 500 is disclosed for creating a directory automatically, commonly the created directory is a distributed directory. A module 502 can communicate upon industrial control system and create a distributed directory based on information commonly originating from at least two controllers 504 and 506. Creation of the new distributed directory can take place upon a new industrial control system as well as an existing system.

An identification component 508 can discover controllers (e.g., entities including modules, machines, software, hardware, firmware, and the like), such as controllers 504 and 506 that are included in the industrial control system. Additionally, metadata that relates to capabilities of the controllers can be ascertained (e.g., through practicing techniques of the gather component 102). In an illustrative instance, a distributed directory can be ultimately created upon storage of the controllers 504 and 506. Data related to storage capabilities of the controllers can be beneficial in determining parameters to associate with the distributed directory.

A creation component 510 can construct a distributed directory such that information can be retained and accessed. Various parameters can be taken into account and predictions can be made in relation to the distributed directory. For instance, if available storage is highly volatile memory, then the distributed directory can be built such that several back-up capabilities are utilized.

A gather component 102 can obtain information from controllers and other units. According to one embodiment, the gather component 102 (e.g., through use of the engagement component 408 of FIG. 4) can collect information from a newly added controller. The identification component 508 can evaluate the newly added controller to determine if aspects can be used to enhance the distributed directory. The creation component 510 can amend the distributed directory to include capabilities of the newly added controller.

A placement component 104 can populate the distributed directory with information of controllers, including the controllers 504 and 506 that are used in constructing the distributed directory. The placement component 104 can perform tests upon the distributed directory to determine if a failure is taking place. If a failure is occurring, is expected to occur, and so forth, then the placement component 104 can instruct the creation component 510 to modify the distributed directory in an attempt to rectify the failure. The creation component 510 can analyze the suggestion, determine an estimated appropriate remedy, and implement the remedy.

Figure 6:
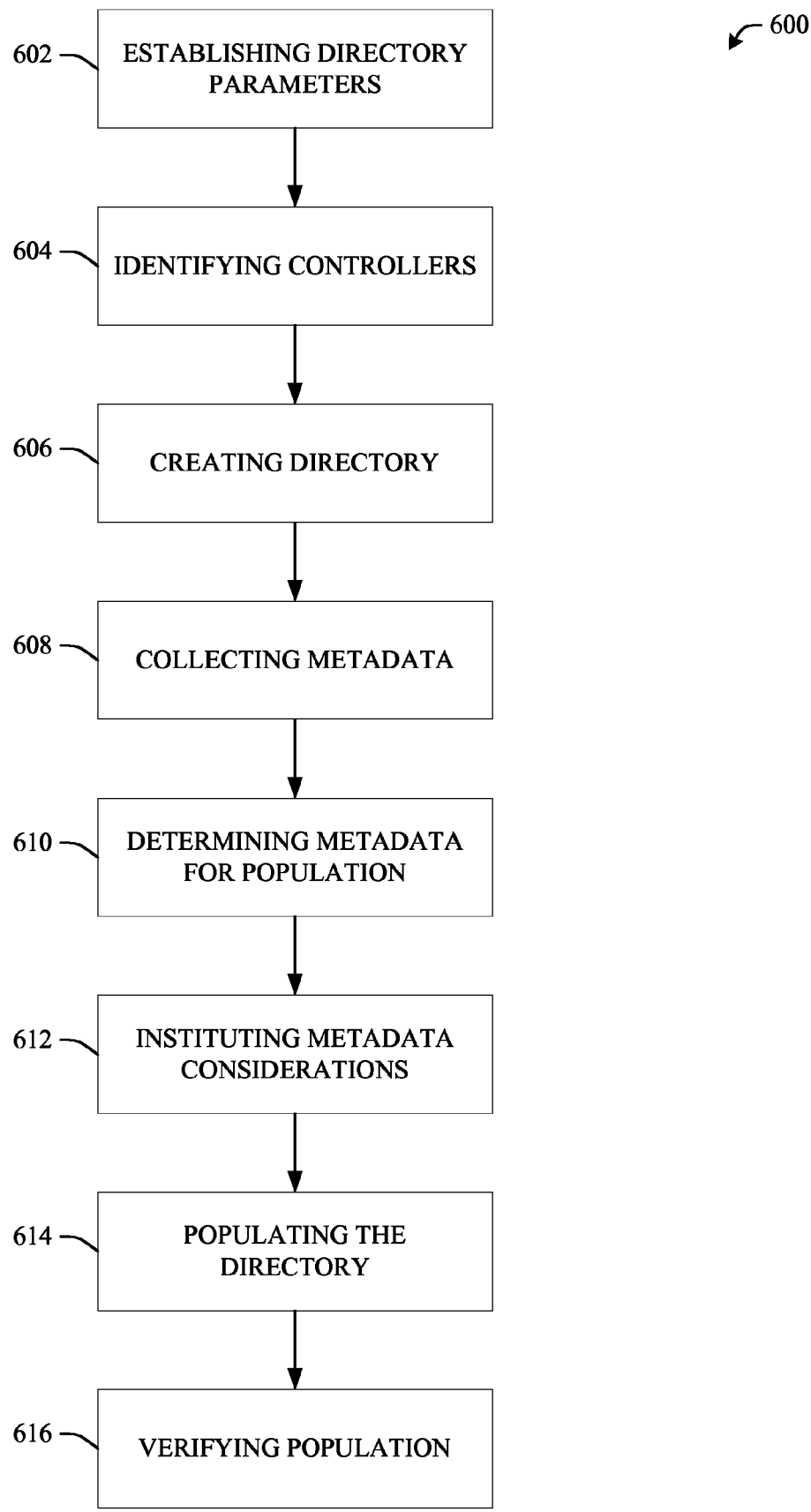
FIG. 6 illustrates a representative directory population methodology in accordance with an aspect of the subject specification.

Now referring to FIG. 6, an example methodology 600 is disclosed for creating and populating a distributed directory. At block 602, various parameters can be established for a distributed directory. A distributed directory can have different parameters to achieve goals related to an industrial control system. An example parameter can be that for a controller to access information, an authorization key should be provided.

Different controllers of an industrial system configuration can be identified at action 604. Commonly, action 604 can include locating at least two controllers, determining paths or addresses of the controllers, and ascertaining characteristics of the controllers (e.g., the controllers have digital storage). Operation of action 604 can result in identifying a set of at least two controllers.

At event 606, a directory can be created (e.g., a distributed directory) based upon established parameters. Creation of a directory can include allocating storage space, creating a storage hierarchy configuration, and sending notification to controllers on how to access information from the directory. Event 606 can implement as creating a directory for population of metadata automatically from at least a subset of the controllers (e.g., a subset includes a set as well as a portion less than a whole of a set).

Metadata can be collected concerning controllers, relationships, and the like through action 608. The information can be collected from newly coupled controllers as well as controllers already coupled. Example collection can include extraction of information, downloading, making a local copy of information held in storage, and the like.

At block 610, determinations can be made on collected metadata that is to be populated upon the created directory. Commonly, a vast amount of metadata can be supplied by a controller, but oftentimes not all metadata is appropriate for placement in the directory. If too much metadata is made available in a directory, processing times can be slowed and requesting controllers can become overburdened with information. Determinations can be made to sort between valuable data and data that should not be published (e.g., not currently published, but can be published at a later time).

Action 612 allows considerations of the metadata to be taken into account before placement upon the distributed directory. The metadata can have restrictions that should be followed with regard to placement upon the distributed directory. In an illustrative instance, a mixer can be lined with a metal alloy. The mixer can be programmed to allow controllers to know that the mixer is metal alloy lined, but not the composition of the alloy. Action 612 can ensure that restrictions, limitations, desires, and the like related to metadata can be followed.

Metadata can populate upon the directory with regard to metadata considerations at event 614. Population of the metadata (e.g., publishing metadata) can include assigning the metadata to particular memory locations of the distributed directory. The directory can determine where information should be placed and population can take place in accordance with directory determinations.

Different checks can take place to verify population of the metadata at action 616. Verification can include determining if information was correctly placed into the directory and if not correctly placed, then making a suitable modification. According to one embodiment, a controller can be assigned a responsibility to refresh information periodically—if information is not refreshed, then the information is deleted from the directory. Action 616 can check if information has been updated and if not, then perform appropriate deletion.

Figure 7:
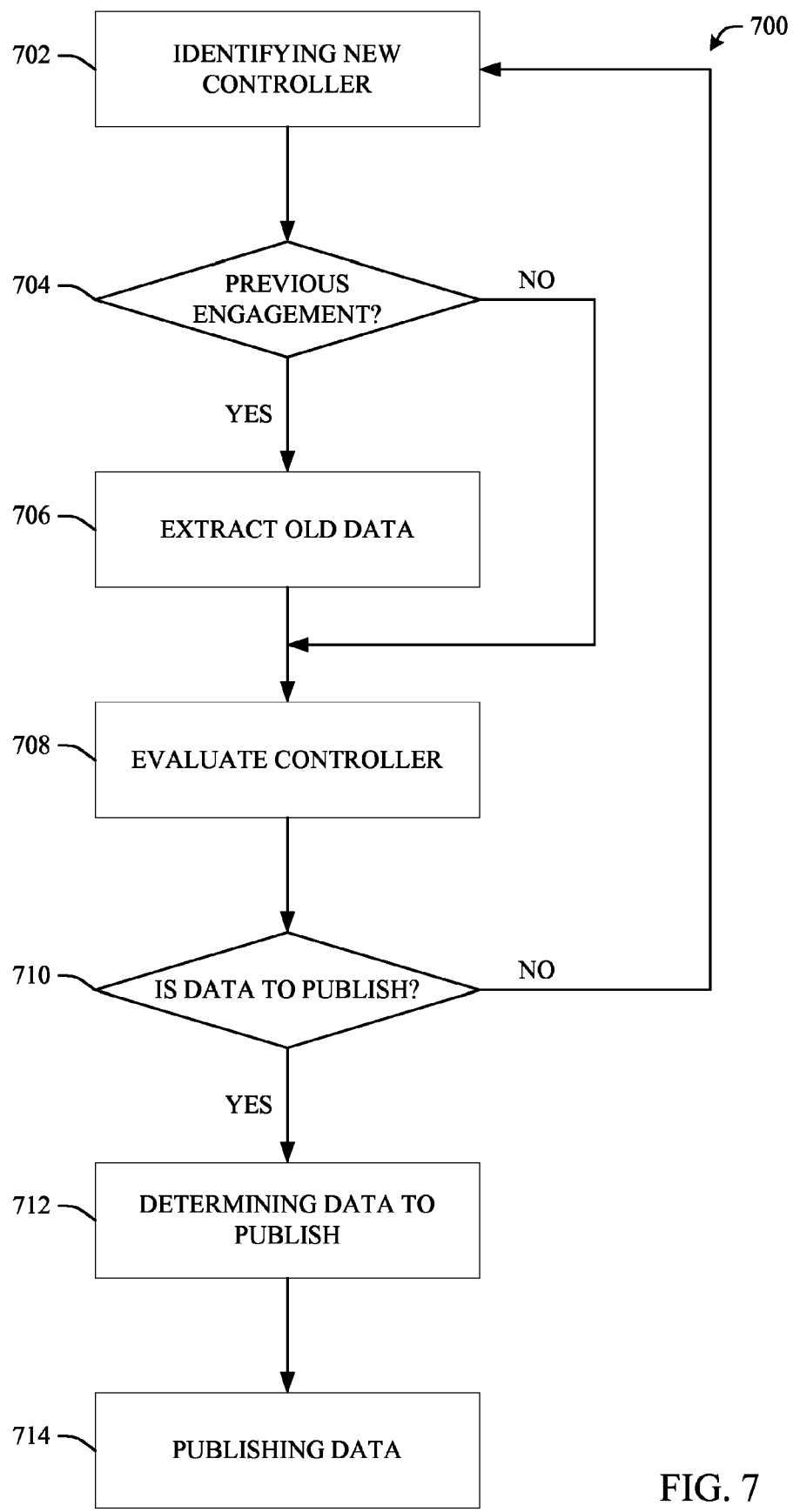
FIG. 7 illustrates a representative methodology for populating a distributed directory with information from a newly coupled controller in accordance with an aspect of the subject specification.

Now referring to FIG. 7, an example methodology 700 is disclosed for populating a directory with data from a newly coupled controller. A controller newly engaged to an industrial control implementation can be identified at action 702. Identification can include learning attributes of the controller, determining a path to the controller, and the like. Upon identification of the controller, it is to be appreciated that a directory (e.g., distributed directory) can be created.

A check 704 can take place determining if there have been previous engagements between the controller and the industrial control system. A 'newly' coupled controller can include a controller that has never coupled to an industrial control system as well as a controller that has been added, but had a previous engagement no longer existing. According to one example, a new controller was coupled at one access point, removed, and re-coupled at a different access point.

If there have been previous engagements, then old data can be extracted at event 706. Commonly, old data, such a binding relationships can be retained from a controller (e.g., in the controller, in the distributed directory, as well as other locations). The old data can be extracted and used in publication of information upon the distributed directory.

Regardless of the outcome of the check 704, the controller can be evaluated to determine data for publication at act 708. For instance, information of the controller can be gathered such as characteristics of a device associated with the controller. Other comparisons can be made, such as similarities between the controller and other entities upon the distributed directory.

A check 710 can take place to determine if there is to be publication of data related to the controller upon the distributed directory. It is possible that a controller has no information that is worthwhile of publication. Therefore, the methodology 700 can return to action 702—however, it is to be appreciated that action 702 can operate continuously as other acts take place.

If data is to be published, then a determination can be made as to what data is to be published at event 712. Since an industrial control system can become overburdened with too much information, selections can be made as to what information merits publication. Determinations and inferences can be made to select information for publication.

The determined data can be issued to other controllers through utilization of the distributed directory at act 714. Analysis of the distributed directory can take place and based upon the analysis appropriate locations for data can be ascertained. Act 714 facilitates placement of the data in the directory in at least some of the appropriate locations, such that different entities can access the data.

Figure 8:
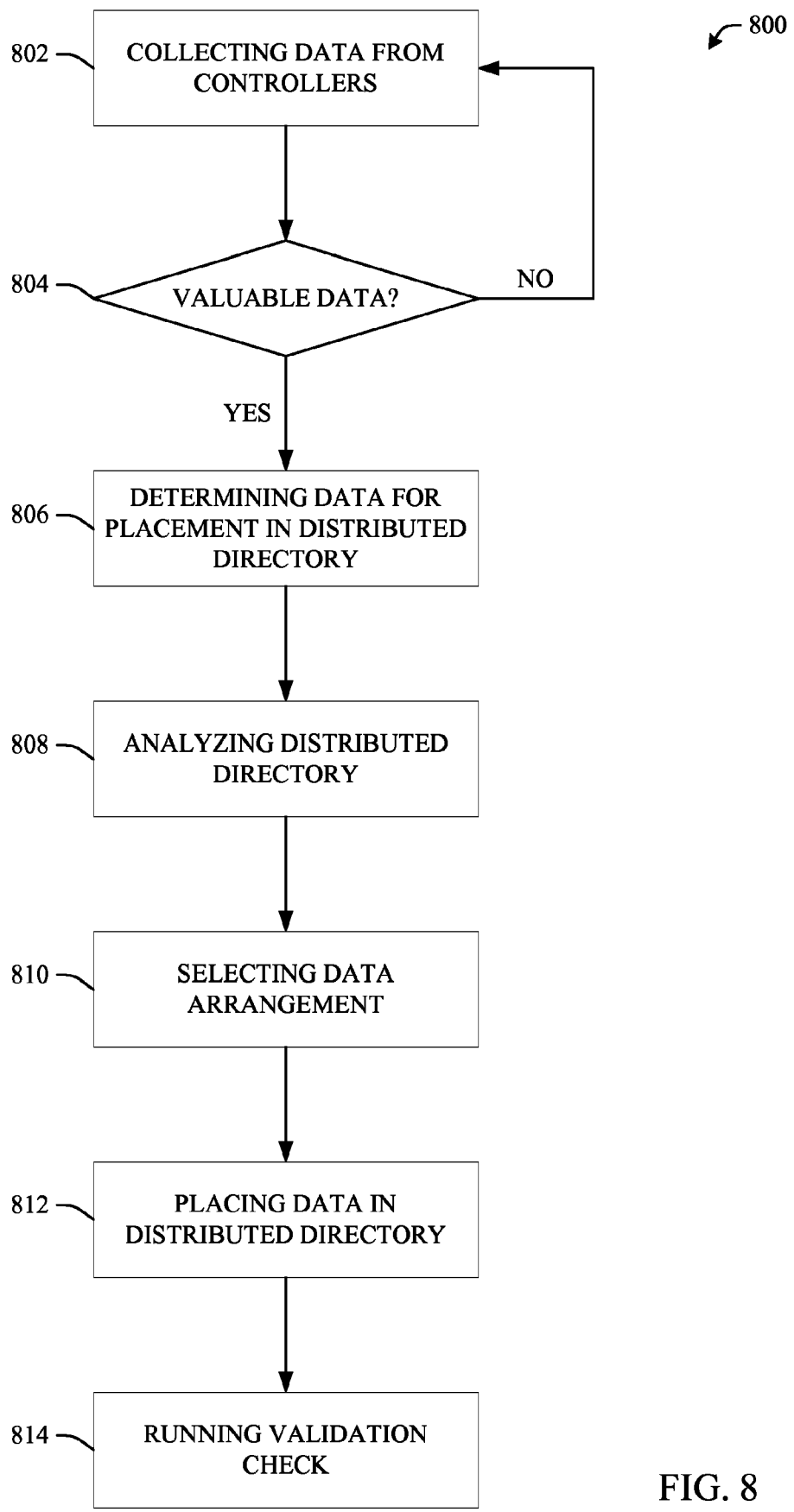
FIG. 8 illustrates a representative data placement methodology in accordance with an aspect of the subject specification.

Now referring to FIG. 8, an example methodology 800 is disclosed for placement of data upon a distributed directory. While similar to methodologies 600 of FIG. 6 and 700 of FIG. 7, the methodology 800 details actions related to data. At block 802, data can be gathered from different controllers of an industrial control configuration. Gathering of data can take place in accordance with various aspects disclosed through the subject specification.

A check 804 can take place to determine if data has enough value to be placed into the distributed directory. If data is not valuable enough (e.g., through comparison against a threshold value) to be placed upon the directory, then more information can be gathered. If data is to be placed in the distributed directory, then a determination is made on specific data for placement at act 806.

At block 808, the distributed directory can be analyzed to assist in how data should be placed. For instance, open memory locations can be determined as well as how the directory is structured. Based upon an analysis result, a specific arrangement can be selected at event 810. An arrangement can be selected randomly, a manner that is most efficient for directory operation, a most logical manner, in a grouped manner, and the like. While the subject specification discloses placement of information related to an industrial control configuration (e.g., an intranet), practicing of aspects can allow for population of the directory with outside information (e.g., from an internet).

Information can be placed in the distributed directory according to the selected arrangement at act 812. At block 814, a validation check can take place in view of data placed in the distributed directory. Validation can include maintaining the distributed directory, including modifying a directory schema base on queries (e.g., user queries) to the directory.

While aspects of the subject specification specifically discuss a distributed directory, it is to be appreciated that at least some aspects can be practiced regarding other directories. For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
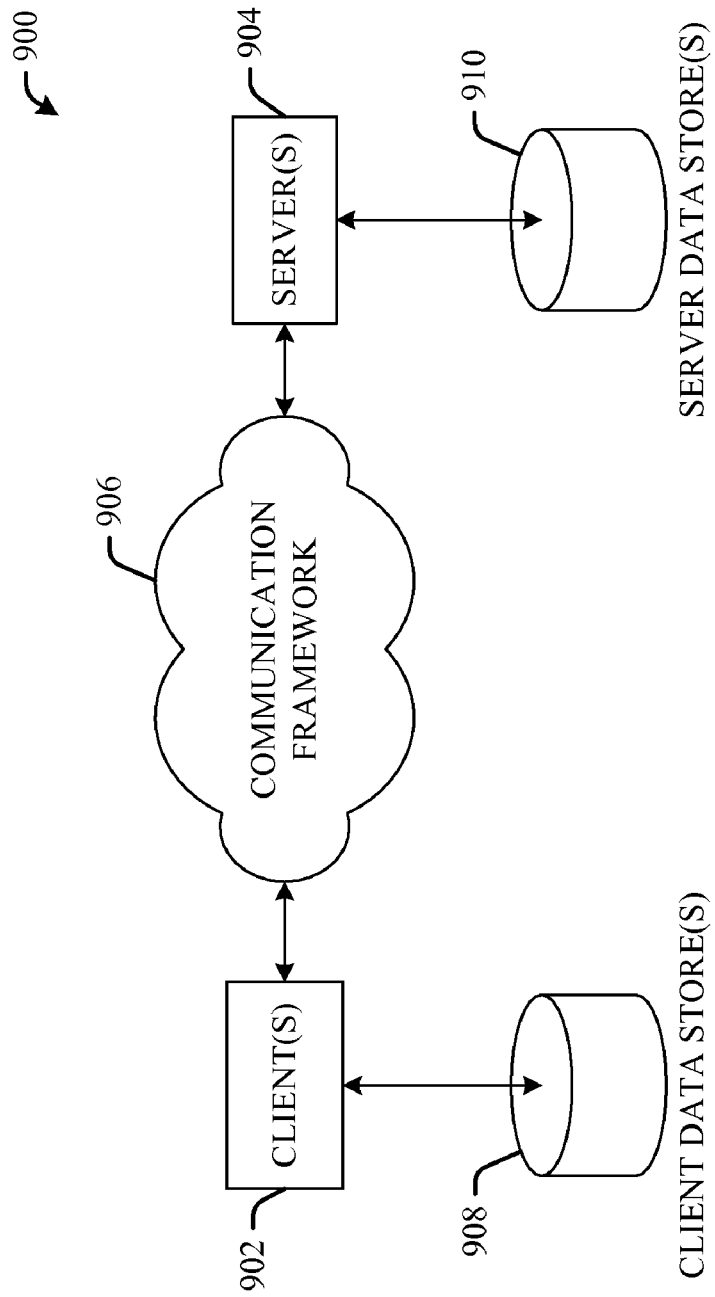
FIG. 9 illustrates an example of a schematic block diagram of a computing environment in accordance with an aspect subject specification.
Figure 10:
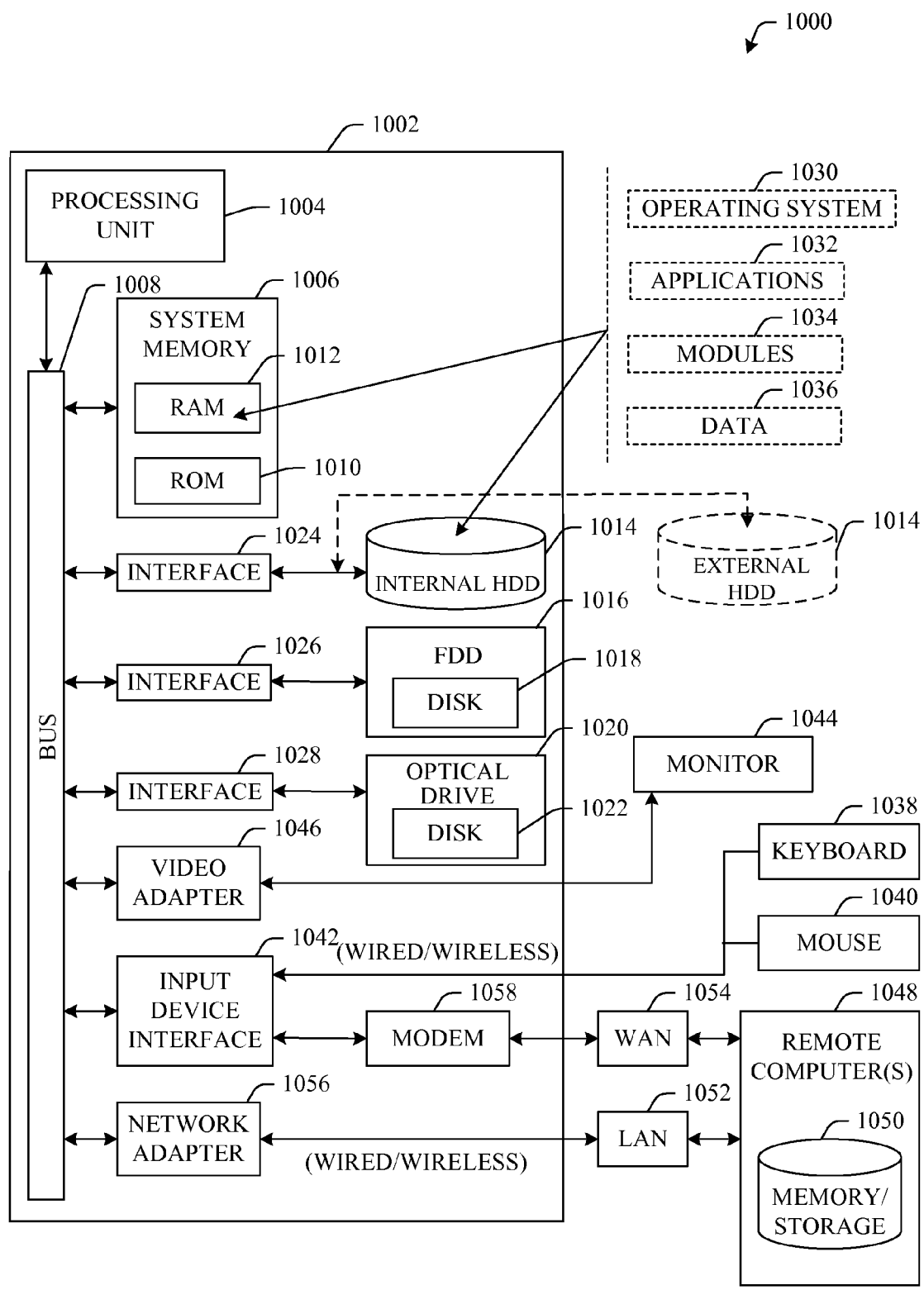
FIG. 10 illustrates an example of a block diagram of a computer operable to execute the disclosed architecture.

To provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. To provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor;
   at least one non-transitory computer readable medium communicatively coupled to the at least one processor, the at least one non-transitory computer readable medium having stored therein computer-executable instructions, comprising:
     a search component configured to learn of an industrial control component or learn of at least one change in a configuration of the industrial control component;
     a gather component configured to collect information from the industrial control component after the search component learns of the industrial control component or learns of at least one change in the configuration of the industrial control component, wherein the collected information comprises metadata related to an industrial process associated with the industrial control component;
     a decision component configured to select at least some of the collected information for population into the distributed directory; and
     a placement component configured to populate the selected at least some of the collected information upon a directory.

2. The system of claim 1, the directory is a distributed directory.

3. The system of claim 1, wherein the collected information comprises at least one service of the industrial control component that is available to at least one other industrial control component.

4. The system of claim 1, wherein the placement component is further configured to determine if a failure is occurring or expected to occur to at least a portion of the directory and take action to remedy the failure.

5. The system of claim 1, further comprising a security component configured to regulate distributed directory information ascertainable by the industrial control component or selectively mask distributed directory information ascertainable by the industrial control component.

6. The system of claim 1, further comprising a creation component configured to build the directory.

7. A system capable of implementation upon an industrial control configuration, comprising:
   means for engaging an industrial control component newly coupled to an industrial control configuration; and
   means for augmenting a distributed directory with metadata that concerns the engaged industrial control component, wherein the newly coupled industrial control component has previously been coupled to the industrial control configuration, augmentation includes updating metadata in the distributed directory added during a previous coupling of the industrial control component.

8. The system of claim 7, the newly coupled industrial control component has not previously been coupled to the industrial control configuration, augmentation includes adding metadata to the distributed directory.

9. The system of claim 7, further comprising means for manually overriding the means for augmenting the distributed directory.

10. A non-transitory computer-readable medium comprising:
    program code for learning of an industrial control component or learning of at least one change in a configuration of the industrial control component;
    program code for collecting information from the industrial control component after the learning of a industrial control component or learning of at least one change in the configuration of the industrial control component, wherein the collected information comprises metadata related to an industrial process associated with the industrial control component;
    program code for selecting at least some of the collected information for population into the distributed directory; and
    program code for populating the selected at least some of the collected information upon the distributed directory.

11. A system, comprising:
    an interrogation component that resolves information of an industrial control component for collection;
    a gather component configured to collect at least a portion of the resolved information from the industrial control component, wherein the collected portion of the resolved information comprises metadata related to an industrial process associated with the industrial control component;
    a decision component configured to select at least some of the collected portion of the resolved information for population into the distributed directory; and
    a placement component configured to populate the selected at least some of the collected portion of the resolved information upon a directory.

12. A system capable of implementation upon an industrial control configuration, comprising:
    a gather component configured to collect information from an industrial control component, wherein the collected information comprises metadata related to an industrial process associated with the industrial control component;
    a decision component configured to select at least some of the collected information for population into the distributed directory; and a placement component configured to populate the selected at least some of the collected information upon a distributed directory; and a security component configured to regulate distributed directory information that can be ascertained by the industrial control component or selectively mask distributed directory information with regard to at least one device.

13. A system, comprising:

means for engaging an industrial control component newly coupled to the industrial control configuration;

means for augmenting a distributed directory with metadata that concerns the engaged industrial control component; and means for manually overriding the means for augmenting the distributed directory.

14. A method, comprising:

learning of an industrial control device or learning of at least one change in a configuration of the industrial control device;

collecting information from the industrial control device after the learning of a industrial control device or learning of at least one change in the configuration of the industrial control device, wherein the collected information comprises metadata related to an industrial process associated with the industrial control component; and selecting at least some of the collected information for population into the distributed directory; and populating the selected at least some of the of the collected information from the industrial control device upon a directory.

15. The method of claim 14, wherein the directory is distributed.

16. The method of claim 14, wherein the collected information comprises at least one service of the industrial control device that is available to at least one other industrial control device.

17. The method of claim 14, further comprising resolving information of the component for collection and collecting at least a portion of the resolved information.

18. The method of claim 14, further comprising regulating distributed directory information that can be ascertained by the industrial control device or selectively masking distributed directory information with regard to at least one device.

19. The method of claim 14, further comprising building the directory.

* * * * *